United States Patent [19]

Schmidt et al.

[11] Patent Number: 4,849,103
[45] Date of Patent: Jul. 18, 1989

[54] FILTER APPARATUS FOR THE UNIFORM FILTRATION OF PLASTIC MELTS

[75] Inventors: Robert Schmidt, Walluf; Herbert Peiffer, Mainz-Finthen, both of Fed. Rep. of Germany

[73] Assignee: Hoechst Aktiengesellschaft, Frankfurt am Main, Fed. Rep. of Germany

[21] Appl. No.: 50,407

[22] Filed: May 18, 1987

[30] Foreign Application Priority Data

May 23, 1986 [DE] Fed. Rep. of Germany ....... 3617370

[51] Int. Cl.[4] .............................................. B01D 29/24
[52] U.S. Cl. .................................. 210/323.2; 210/340; 210/346; 210/486; 210/497.01; 425/199
[58] Field of Search .................... 210/323.2, 331, 340, 210/346, 457, 486, 497.01; 425/197, 199

[56] References Cited

U.S. PATENT DOCUMENTS

| | | | |
|---|---|---|---|
| 2,789,699 | 4/1957 | Piston | 210/457 |
| 3,458,047 | 7/1969 | White | 210/457 |
| 3,503,516 | 3/1970 | Harms et al. | 210/323.2 |
| 3,598,243 | 8/1971 | Guthoniski | 210/340 |
| 4,146,485 | 3/1979 | Broad | 210/457 |
| 4,267,039 | 5/1981 | Ryan | 210/323.2 |
| 4,526,688 | 7/1985 | Schmidt et al. | 210/323.2 |
| 4,613,438 | 9/1986 | De Graffenreid | 210/346 |

FOREIGN PATENT DOCUMENTS 3419822 11/1985 Fed. Rep. of Germany .

OTHER PUBLICATIONS

Kunststoff, 70, (Plastics, 70), 1980, No. II, pp. 753–758, by F. Hensen and H. Simetzki.
Filtrieren von Kunststoffschmelzen (Filtration of Plastic Melts), VDI Verlag GmbH, 1981, pp. 20–21, Kunststofftechnik.
Plastverarbeiter, 33, Jahrgang 1982, No. 12, pp. 1447–1454, (Einsatz von Frossflachenfiltern und dynamischen Mischern zur Qualitatsverbesserung.
"SPE-Antec", 38, 1980, pp. 92–95, R. R. Kraybill, Flow Equations for High Viscosity Polymer Melts in Cylindrical Cartridge Filters.
"Mechanische Verfahrenstechnik", (Mechanical Process Engineering) by R. Rautenbach, RWTH Aachen., SS 1978, pp. 112–128.

Primary Examiner—Richard V. Fisher
Assistant Examiner—Wanda L. Millard
Attorney, Agent, or Firm—Foley & Lardner, Schwartz, Jeffery, Schwaab, Mack, Blumenthal & Evans

[57] ABSTRACT

A filter apparatus is provided comprising a number of cylindrical candle filters, each of which contains a displacement body forming a space of uniform width between itself and the candle filter. The filter material of the candle filter is supported by a cylindrical supporting body which has passages through which a plastic melt to be filtered can flow. A number of filter apparatuses can be arranged on concentric circles on a cylindrical filter housing so as to minimize the dwelling time of the plastic melt flow through the filters and to minimize the pressure loss over the length of the filters.

7 Claims, 3 Drawing Sheets

FILTER APPARATUS FOR THE UNIFORM FILTRATION OF PLASTIC MELTS

BACKGROUND OF THE INVENTION

1. Field of the Invention

The invention relates to a filter apparatus for the uniform filtration of plastic melts, with a filter housing containing candle filters which each comprise a supporting body and a filter material and through which flows the plastic melt to be filtered.

2. Description of the Prior Art

A filter apparatus of this type is described, for example, in the periodical *Kunststoff* 70 [Plastics 70], year of publication 1980, No. II, pages 753 to 758, by F. Hensen and H. Simetzki. By means of filter apparatuses for plastic melts, impurities contained in the melt, such as dirt, gel particles, unmelted material and the like, are separated as efficiently as possible. Depending on the degree of purity required, mesh widths or pore widths of the filter material, which is screen netting, sintered material, nonwovens and the like, of 40 to 80 microns for polypropylene oriented films and 5 to 10 microns for polyterephthalate acid ester oriented films (polyester film or PETP film) are necessary for this purpose. These narrow mesh widths necessitate large filter surfaces to minimize the total pressure drop in the filter apparatus and the increase in the pressure drop in the course of time; on the other hand, a high total pressure drop and a sharp increase in the pressure drop in the course of time add to the costs of the filter process.

German Offenlegungsschrift No. 3,419,822 discloses a filter apparatus for screw-type extruders for the treatment of plastic melts having a filter housing with an inflow and an outflow bore and with an alternating slide displaceable in the latter bore transversely relative to the melt stream. At least one recess in the alternating slide receives a screening element. To ensure a uniform distribution of the melt stream in the filter apparatus and of the pressure forces exerted on the filter surface, the recess is annular, and there is a melt channel which communicates with the inflow bore and in which the cylindrical screening element surrounds the recess positively. A throughflow bore extending in the longitudinal axis of the alternating slide connects the inflow bore to the outflow bore in the filter housing. A displacement cone is installed in the throughflow bore, thus producing an annular collecting channel which widens towards the outflow bore in the direction of flow of the melt.

This known filter apparatus is a so-called filter pot, generally having a single filter surface of cylindrical shape which is arranged in the housing wall of the filter apparatus in the inflow and outflow bores. In the known filter apparatus, the aim is to achieve a uniform distribution of the melt stream in the filter and of the pressure forces exerted on the filter surface, and the complete elimination of transverse forces exerted on the guide surface of the alternating slide. The displacement cone in the melt channel is intended to reduce the flow resistance of the melt to a minimum in the alternating slide, while at the same time ensuring a crosssectional ratio favorable in flow terms.

From the point of view of the process used, it is desirable, when the filter surface is installed, to have a filter pot with as small a volume as possible and with no or only very small dead zones. In a filter pot, the filter surface generally forms the largest part of the pot circumference or housing wall, the external shape of the filter pot being similar to that of a cylindrical candle filter. If there are no or only very small dead zones in the filter pot, the dwelling-time distribution of the individual particles is short and the decomposition of the melt is minimal. The dwelling-time distribution describes what fraction of the mass particles have left the component after what time. The dwelling-time distribution of the melt particles in a pipe through which the flow passes can be calculated by integrating the speed of the individual particles over the cross section of the pipe. As is known, the speed near the pipe wall is virtually zero and increases to the maximum value towards the center of the pipe. The narrowness of the dwelling-time distribution refers to the fact that over the full pipe cross section the speed differences of the particles should be as small as possible, that is to say, the dwelling times of the melt particles should have as little differences as possible over the pipe cross section, and this can only be achieved if the speed distribution of the particles is flattened out to a great extent, this only occurring when the speed maximum levels off sharply in the center of the pipe.

This means, in other words, that the rise of the time curve representing the fraction of particles which have left the component per unit of time is very steep.

A preliminary condition for ensuring that the dead times are as little as possible is that the melt must flow through the complete filter volume. This is easiest to achieve if, within the filter pot, the speed vector changes only very slightly or not at all in terms of both amount and direction. A constructive design of the filter apparatus, in which, for example, the melt flow is deflected 90° to 180°, should be avoided if possible.

According to the present state of the art described, for example, in the literature references "Filtrieren von Kunststoffschmelzen" ["Filtration of plastic melts"], VDI Verlag GmbH, 1981, *Kunststoff* 70 [*Plastics* 70], year of publication 1980, No. II, pages 753 to 758, and *Plastverarbeiter* [*Plastics Worker*], Volume 33 1982, No. 12, pages 1447 to 1454, compact filter apparatuses meeting the above-mentioned requirements can best be provided by arranging filter inserts of candle or discus shape concentrically in filter housings. To obtain a compact design in a filter apparatus with candle filters, the candle filters are arranged with their center points generally on concentric circles, starting from the center of the filter housing where a central candle filter is located. The flow through the filter apparatus takes place without any substantial deflection of the melt stream which, for example, flows in from above and flows out of the filter housing again at the bottom. In this known filter apparatus, the dwelling-time distribution is not sufficiently narrow, and the length of the filter service life still leaves much to be desired.

SUMMARY OF THE INVENTION

It is an object of the invention to provide a filter apparatus in which the dwelling time of the plastic flow melt is shortened, the dwelling-time distribution is kept narrow, the pressure loss over the length of the filter apparatus remains small and the filter service life is as long as possible.

It is an additional object of the invention to provide substantially the same flow resistance inside and outside an individual candle filter.

It is yet a further object of the invention to provide a filter apparatus in which the pressure loss between the pressure outside the individual candle filter and the pressure inside the candle filter is virtually constant over the length of the candle filter.

In accomplishing the foregoing objects, there has been provided according to the present invention a filter apparatus for the uniform filtration of plastic melts, comprising a filter housing having a plurality of candle filters; therein each of the candle filters permitting passage of a flow of plastic melt therethrough and having a filter material supported by a supporting body and a displacement body positioned within the supporting body, whereby the displacement body and the supporting body define a space of uniform width therebetween. Preferably, the displacement body and the supporting body have generally cylindrical configurations; and the diameter of the cylindrical configuration of the displacement body is less than about 8/10 of the inside diameter of the cylindrical configuration of said supporting body, and is preferably greater than about 4/10 of the inside diameter of the cylindrical configuration of the supporting body.

Further objects, features, and advantages of the present invention will become apparent from the detailed description of preferred embodiments which follows, when considered in conjunction with the attached figures of drawing.

BRIEF DESCRIPTION OF TH DRAWINGS

The invention is explained in detail below with reference to the drawings. In these:

FIG. 4 shows a plan view of three candle filters, the centers of which form the corner points of an equilateral triangle of edge length a;

DETAILED DESCRIPTION OF THE PREFERRED EMBODIMENTS

The invention provides, in the filter apparatus described at the outset, a structure wherein each candle filter contains in the supporting body a displacement body which forms a gap of constant width with the inner wall of the supporting body.

In an embodiment of the invention, the individual candle filter is cylindrical, and the diameter of the cylindrical displacement body is less than 8/10 of the inside diameter of the supporting body. The diameter of the cylindrical displacement body is appropriately greater than 4/10 of the inside diameter of the supporting body.

In an embodiment of the invention, the outside and inside diameters of the supporting body, the diameter of the displacement body and the distance a of the candle filters from one another are such that the same flow resistance prevails inside and outside the individual candle filter. At the same time, the pressure loss between the pressure $p_a$ outside the individual candle filter and the pressure $p_i$ inside the candle filter is virtually constant over the entire length of the cande filter.

In one embodiment of the invention, the geometry of the candle filters being the same and the melt throughput being the same, the shortest distance a between the centers of adjacent candle filters amounts to 9/10 of the shortest distance between adjacent candle filters in a conventional filter apparatus.

Plastic melts, especially high-viscosity melts, can be filtered effectively by means of the filter apparatus according to the invention, that is to say, long filter service lives are achieved as the result of a low pressure loss, short dwelling times with a narrow dwelling-time distribution because of a shape favorable in flow terms and a corresponding construction, and a uniform filter coating are achieved. Because of the last two measures mentioned, and because the filter apparatus contains hardly any dead corners, the decomposition of the melt is only very slight. The decomposition of the melt means, here, that the average molecular weight of the melt becomes lower as a result of the longer action of a higher temperature on the melt.

Figure 1:
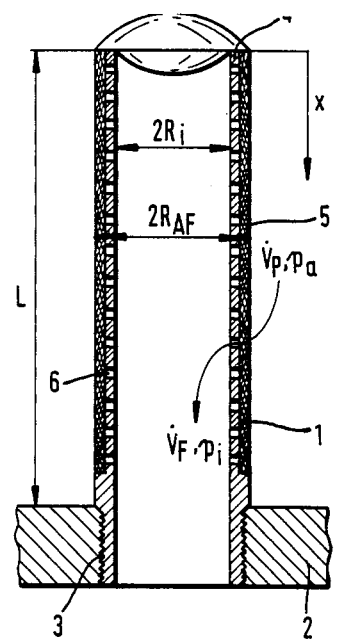
FIG. 1 shows a sectional view through a candle filter of known art.

FIG. 1 shows, in longitudinal section, a candle filter 1 having at the bottom end a thread 3 which is engaged with a corresponding threaded hole in a base plate 2. The candle filter 1 has a constructional length L, over most of which extends a filter material 5 attached to a supporting body 4. In accordance with the prior art, the filter material 5 consists, for example, of a screen netting, in particular, wire netting, sintered metal powder or nonwovens. The filter material 5 forms most of the circumference of the supporting body 4 which has passage orifices 6 for the plastic melt to be filtered. The unfiltered plastic melt flows against the candle filter 1 from outside, passes through the filter material 5 and the passage rifices 6 in the supporting body 4 and flows off through the supporting body 4 on the inside. The supporting body 4 does not contain any further structure. The inside diameter of the supporting body 4 is equal to $2R_i$, and the outside diameter of the supporting body is equal to $2R_{AF}$. The curved arrow in FIG. 1 indicates the flow path of the plastic melt to be filtered. The volumetric flow of the plastic melt outside the candle filter 1 is given by $\dot{V}_p$, while $p_a$ represents the pressure in the stream of plastic melt outside the candle filter 1. The volumetric flow or filtrate flow inside the candle filter 1 is given by $\dot{V}_F$, whilst $p_i$ represents the pressure inside the candle filter 1.

The favorable flow design of the individual candle filters 1 in a known filter apparatus 7, such as that illustrated in FIG. 5 and described in more detail below, relates mainly to the inside and outside diameters of the candle filters and to the distance a of the candle filters from one another, when the external dimensions of the filter apparatus 7, in particular its length and diameter, are predetermined.

Calculations and experimental analyses of the filtrate flow through the individual candle filters 1 inside the known filter apparatus 7 containing a plurality of candle filters 1 show that the total pressure loss is lowest and the filter coating is most uniform when the pressure difference $\Delta p = p_a(x) - p_i(x)$ is as constant as possible over the entire candle filter length L.

Figure 2:
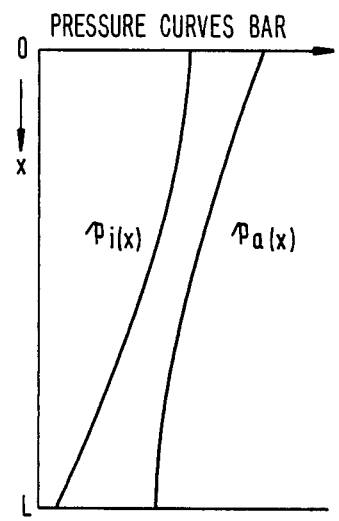
FIG. 2 shows diagrammatically the pressure curves over the length of the candle filter according to FIG. 1 inside and outside the candle filter.

FIG. 2 shows diagrammatically the pressure curves as a function of x over the candle filter length L of an individual candle filter 1. In absolute terms, the pressure $p_a(x)$ outside the candle filter 1 is higher over the entire candle filter length L than the pressure $p_i(x)$ inside the candle filter 1. The pressures are each at their highest at the top end of the candle filter 1 and decrease towards the foot of the candle filter 1.

While bearing in mind the condition that the pressure difference $\Delta p$ should be as constant as possible, the geometrical dimensions of the candle filters 1 and the distances of the candle filters 1 from one another can be calculated.

The calculation methods are described in detail, for example, in the article by R.R. Kraybill "SPE-Antec" 38, year of publication 1980, pages 92 to 95. The equations given there apply, strictly speaking, to a pottype filter, but, if modified appropriately, can also be used for filter apparatuses with a number of candle filters 1. It should be remembered, at the same time, that these methods apply to a constant viscosity of the melt and do not take into account the intrinsically viscous behavior of the plastic melt.

In order to design any given geometries of candle filters, a model of a candle filter 1 starting from a division of the candle filter length L into N segments, so that a variable viscosity of the melt can also be taken into account, was developed. The most important equations used in this model are set out briefly below. For this, reference is made to FIGS. 3 and 4.

Figure 3:
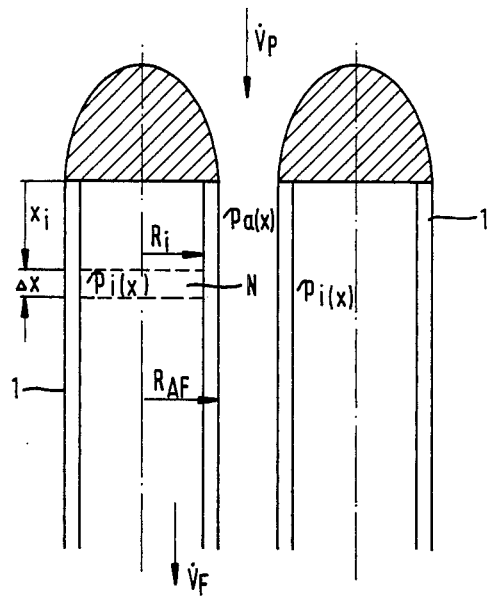
FIG. 3 shows diagrammatically a longitudinal section through two adjacent candle filters.

FIG. 3 shows diagrammatically longitudinal sections through two candle filters 1,1 placed next to one another. Outside the candle filters 1,1, the volumetric flow $\dot{V}_p$ moves from the top downwards, the pressure $p_a(x)$ prevailing in the plastic melt. Each candle filter 1 has an inner radius $R_i$ and an outer radius $R_{AF}$. Inside each candle filter 1, a pressure $p_i(x)$ prevails in the filtrate flow or volumetric flow $\dot{V}_F$. The following equations apply to the length element $\Delta x$ of the individual segment N in FIG. 3:

Volumetric flow $\dot{V}_p$ outside the candle filter 1:

$$\dot{V}_p = -\frac{\pi R_a^4}{8 \eta_{a,i}} \frac{dp_a}{dx_i} \quad (1)$$

In equation 1, $n_{a,i}$ denotes the so-called representative viscosity in the segment i, meaning that the specific viscosity value na is taken instead of the actual viscosity distribution.

Figure 4:
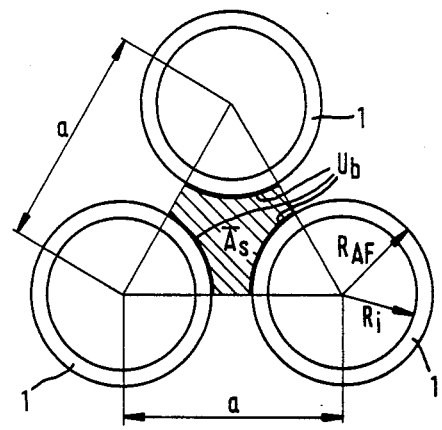

At the same time, the hydraulic radius $R_a$ is calculated via the hydraulic area $\overline{A_s}$ between the candle filters 1,1, the hydraulic area $\overline{A_s}$ being represented by hatching in the plan view in FIG. 4 and, in a space outside three adjacent candle filters 1, is contained by the wetted circumference $U_b$ of the three candle filters and by the connecting sides drawn through the centers of the candle filters 1 which form the corner points of a triangle. As is evident from FIG. 4, the connecting sides of the centers of the candle filters 1 are sides of an equilateral triangle of side length a which is also the distance between the centers of two adjacent candle filters 1,1. The wetted part circumferences of the three candle filters 1 in FIG. 4, which together form the wetted circumference $U_b$ of the hydraulic area $A_s$, marked by thicker lines in FIG. 4.

Thus, the following equation is valid for the radius $R_a$:

$$2R_a = \frac{4A_s}{U_b} \quad (U_b = \text{wetted circumference}) \quad (2)$$

The volumetric flow $\dot{V}_F$ (filtrate flow) inside the candle filter 1 is given by $$\dot{V}_F = -\frac{\pi R_i^4}{8 \eta_{i,i}} \frac{dp_i}{dx_i} \quad \text{(pipe flow)} \quad (3a)$$

As already mentioned above, FIG. 5 shows diagrammatically a plan view of a known filter apparatus 7 designed on the basis of equations (1), (2) and (3a). A central candle filter 1 is arranged at the center point of the filter apparatus 7, and around this further candle filters 1 are grouped on concentric circles 8, 9 and 10. The centers of these further candle filters 1 are respectively located on these concentric circles 8 to 10, and the centers of the individual candle filters 1 are arranged on the imaginary concentric circles 8 to 10 in such a way that any three candle filters adjacent to one another form with their centers an equilateral triangle of edge length a and enclose a constant hydraulic area $\overline{A_s}$. As already mentioned, none of the candle filters 1 in the known filter apparatus 7 has a displacement body inside it.

Figure 6:
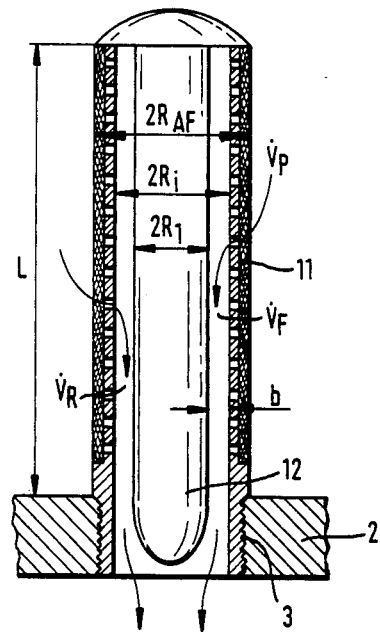
FIG. 6 shows a longitudinal section through an individual candle filter according to the invention.

FIG. 6 shows a diagrammatic longitudinal section through a candle filter 11 according to the invention, which inside its supporting body 4 contains a displacement body 12 forming a gap of constant width b with the inner wall of the supporting body 4. The candle filter is cylindrical in a similar way to the candle filter 1 according to FIG. 1 and at its bottom end has a thread 3 which is engaged with a threaded hole in the base plate 2 of a filter apparatus. The candle filter 11 comprises the supporting body 4 and the filter material 5, the supporting body once again containing passage orifices 6, through which the plastic melt to be filtered flows into the gap of width b. The filtered plastic melt then flows off downwards through the base plate 2. The flow path of the plastic melt outside and inside the candle filter 1 is indicated by corresponding arrows in FIG. 6. The diameter $2R_1$ of the cylindrical displacement body 12 is less than 8/10 and more than 4/10 of the inside diameter $2R_i$ of the supporting body 4. The volumetric flow $\dot{V}_R$ in the gap between the displacement body 12 and the inner wall of the supporting body 4 is calculated according to the following equation:

$$\dot{V}_R = -\frac{\pi(R_i^4 - R_f^4) R_F}{8 \eta_{i,i}} \frac{dp_i}{dx_i} \quad (3b)$$

$$R_F = R_i \left( 1 + K_F^2 + \frac{1 - K_F^2}{\ln K_F} \right)^{\frac{1}{2}}$$

$$K_F = R_1 / R_i$$

Equation (3b) applies when the concentric displacement body 12 of the radius $R_1$ is inserted in the supporting body of the candle filter 11.

The filter flow passing through the surface element $dA = 2\pi R_{AF} dx$ is calculated according to $$dV_{F,i} = 2\pi R_{AF} \frac{1}{W} [P_{a,i} - P_{i,i}], \quad (4)$$

with the filter resistance W dependent on the location i and which can be calculated according to known methods of cake filtration, as described, for example, in the reprint of the lecture "Mechanische Verfahrenstechnik" "Mechanical Process Engineering" ]by R. Rautenbach, RWTH Aachen.

By numerical integration of the above-mentioned equations (1) to (4) with the corresponding boundary conditions, with the predetermined geometry, in particular, predetermined values for the variables $R_i$, $R_1$, L and $R_a$, t is possible to determine the pressure loss $\Delta p = p_a - p_i$ and, by further integration, the filtrate quantity $V_F$ as a function of time.

In these design calculations, it was unexpectedly shown that the total pressure drop in the course of time develops in an especially favorable way if the additional concentric displacement body 12 is installed in the candle filter.

Figure 5:
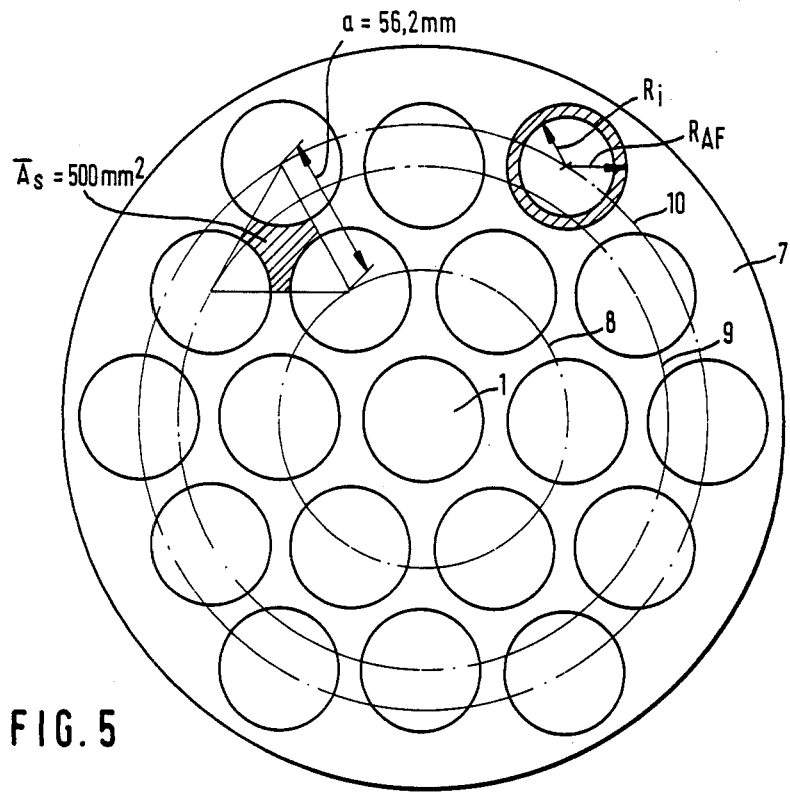
FIG. 5 shows a diagramatic plan view of the arrangement of the candle filters in a known filter apparatus.

In the arrangement illustrated in FIG. 6, although the flow resistance during the discharge of the filtrate is greater than in the conventional candle filter without a displacement body, in order to achieve a constant pressure difference $\Delta p$ over the candle filter length L, the candle filters can be packed more closely together than in a conventional filter apparatus, such as that shown in FIG. 5. This results in a higher packing density of the candle filters per unit volume, as explained below by reference to the filter apparatus 13 according to the invention, shown in FIG. 7. In the filter apparatus 13, the candle filters 11 are arranged in the cylindrical filter housing 18 with their centers on imaginary concentric circles 15, 16, 17. In comparison with the known filter apparatus, this filter apparatus has a higher packing density of the candle filters 11 per unit volume. This is equivalent to an increase of the filter surface over the predetermined total volume V, as a result of which the coating of the filter material with filtrate obviously takes place more slowly. Also, installing a displacement body 12 in each candle filter 11 results in a shortening of the dwelling time of the plastic melt, thereby positively reducing the decomposition of the melt. In the filter apparatus 13 according to the invention, the pressure loss between the pressure $p_a$ outside the individual candle filter 11 and the pressure $p_i$ inside the candle filter 11 is approximately constant over the entire candle filter length L.

Figure 7:
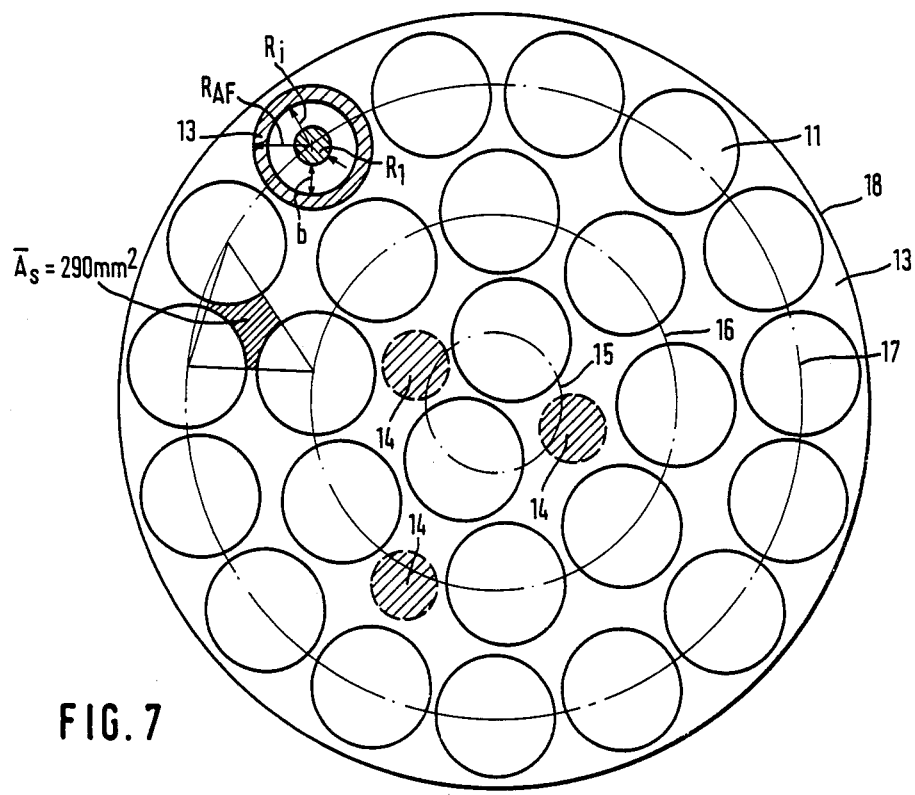
FIG. 7 shows a diagrammatic plan view of the arrangement of the candle filters in a filter apparatus according to the invention.

As is evident from FIG. 7, flow bodies 14 for limiing the size of the hydraulic area $\overline{A_s}$ contained between the candle filters 11 are arranged between some adjacent candle filters 11. These flow bodies 14 are necessary to prevent the hydraulic areas between several adjacent candle filters 11 from becoming too large and thus causing the flow conditions between and in the candle filters to vary undesirably. The outside diameter $2R_A$ of a candle filter 11 in the filter apparatus 13 according to FIG. 7 is determined according to the relation $2R_A = 4 \overline{A_s}/U_b$, with the circumference $U_b$, wetted by the plastic melt, of three candle filters 11, the centers of which form the corner points of a triangle which encloses the hydraulic area $\overline{A_s}$ the space outside the three candle filters 11. As shown by reference to the two examples given below, with the geometry of the candle filters being the same and the melt throughput being the same, the shortest distance a between the centers of adjacent candle filters in the filter apparatus 13 according to the invention is approximately equal to 9/10 of the shortest distance between adjacent candle filters 1 in the conventional filter apparatus 7. As a result of the higher packing density of the candle filters 11 according to the inventon, the hydraulic area $\overline{A_s}$ is also less than the hydraulic area $\overline{A_s}$ of a conventional filter apparatus 7 and is generally only 55 to 60% of its area.

Of course, it is also possible to omit the flow bodies if the total volume of the filter apparatus is appropriately small, since the hydraulic areas $\overline{A_s}$ between several adjacent candle filters are then within the desired range.

A conventional filter apparatus can be compared with the filter apparatus according to the invention by means of two examples.

Design of the geometry of a conventional filter apparatus:

The pot volume V has a height of 0.5 m and a diameter of 0.28 m. The geometry of the individual candle filter 1 is given by the candle filter length L=0.5 m, the outside diameter $2R_{AF}$ of the candle filter of 47 mm and the inside diameter $2R_i$ of the candle filter of 32 mm.

On the basis of these geometrical dimensions, the calculation according to equations (1) to (3a) results in the use of 19 candle filters 1 in the filter apparatus 7. For this flter apparatus 7, the throughput $\dot{m}$ of melt is equal to 2,500 kg/h, polypropylene having the viscosity $\eta$ given below being used and the temperature of the melt being T=270° C.

$$\eta = \frac{3055 \cdot a_T}{1 + 0.287710^{-2}(3055 \cdot a_T \cdot \dot{\gamma})^{0.623}} (Pas)$$

$$a_T = \exp\left[5136\left(\frac{1}{273 + T_o/°C.} - \frac{1}{273 + T/°C.}\right)\right]$$

$$T_o = 230 \cdot °C.$$

So that the pressure difference $\Delta p = p_a - p_i$ remains as constant as possible over the candle filter length L, the distance a between the candle filters 1 (see FIG. 4) is calculated at a =56.2 mm. The overall configuration of the candle filters 1 in the filter apparatus 7 is shown diagrammatically in FIG. 5.

Design of the filter apparatus 13 according to the invention:

In comparison with the example relating to the state of the art, the volume V of the filter apparatus 13, the melt throughput, the candle filter geometry with L=0.5 m, D=0.28 m, $2R_{AF}=47$ mm and $2R_i=32$ mm, and the melt to be conveyed remain unchanged.

The maximum number of candle filters 11 accommodated in the predetermined volume is calculated by means of the equations (1) to (4), with the proviso that the pressure drop $\Delta p = p_a - p_i$ remains as constant as possible over the candle filter length L. The diameter $2R_1$ of the displacement body 12 in the individual candle filters 11 is also determined.

The result is that the predetermined volume accommodates 25 candle filters 11 which on average are at a distance of a=51 mm from one another. To obtain a more uniform pressure difference $\Delta p$, according to the calculation the displacement bodies 12 must on average have a diameter of $2R_1 = 14$ mm. The hydraulic area $\overline{A_s}$ amounts to 290 mm$^2$, in comparison with the hydraulic area $\overline{A_s}$ of 500 mm$^2$ in the conventional filter apparatus 7.

FIG. 7 illustrates the arrangement of the candle filters 11 in the filter apparatus 13.

Figure 8:
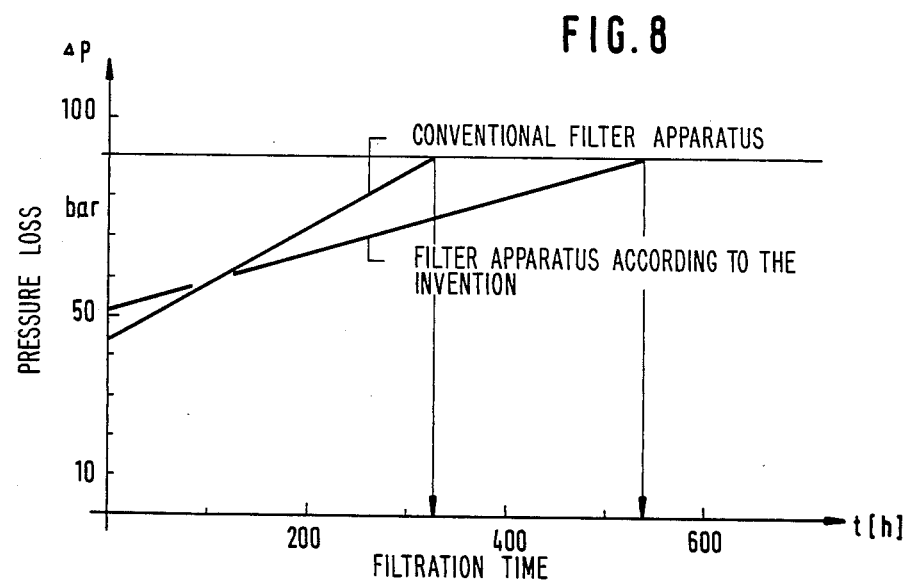
FIG. 8 shows diagrammatically the pressure loss as a function of the filtration time in a known filter apparatus and in a filter apparatus according to the invention.

It is very interesting to compare the two filter apparatuses 7 and 13 with regard to the increase in pressure loss as a function of time which is shown diagrammatically in FIG. 8.

According to this comparison, at the start of the filtering process, that is to say, at the time t=0, the pressure loss Δp in the filter apparatus 7 is less than in the filter apparatus 13 according to the invention, but because of the smaller filter surface the increase in the pressure loss during the course of the filtering process is greater than in the filter apparatus 13 according to the invention. If a pressure loss of $\Delta p_{max}=90$ bars is assumed as a practical upper limit, this value is reached after an operating time of approximately 300 hours in the known filter apparatus 7 and only after an operating time of approximately 540 hours in the filter apparatus 13 according to the invention.

Because displacement bodies are installed in all the candle filters of the filter apparatus 13 according to the invention, the filter service life is lengthened tremendously, and the relative gain of additional filter service life amounts to more than 60% in comparison with the conventional filter apparatus 7.

What is claimed is:

1. A filter apparatus for filtering plastic melts comprising:
   a filter housing;
   a plurality of longitudinally upstanding spaced-apart, cylindrical candle filters disposed within said housing;
   each of said candle filters comprising a hollow cylindrical support body, filter material attached to said support body, and a plurality of passage orifices in said support body; and
   flow restricting means through which there is no flow disposed within said hollow cylindrical support body to provide a restricted flow passageway through said candle filter, said flow restricting means coacting with said cylindrical support body to define a flow passageway of uniform spacing between the flow restricted means and the support body;
   the spacing between said candle filters in said housing and the spacing between said flow restricting means and said cylindrical support body within each candle filter being such as to provide substantially constant flow resistance inside and outside of each of said candle filters.

2. A filter apparatus as claimed in claim 1 wherein:
   said flow restricting means and said supporting body have generally cylindrical configurations; and
   the diameter of the cylindrical configuration of said flow restricting means is less than about 8/10 of the inside diameter of the cylindrical configuration of said supporting body.

3. A filter apparatus as claimed in claim 2 wherein:
   the diameter of the cylindrical configuration of said flow restricting means is greater than about 4/10 of the inside diameter of the cylindrical configuration of said supporting body.

4. A filter apparatus as claimed in claim 2 wherein:
   said diameters are selected so that the pressure loss between the pressure outside each of said candle filters and the pressure inside each of said candle filters is substantially constant over the length of said candle filter.

5. A filter apparatus as claimed in claim 1 wherein:
   said filter housing is cylindrical; and
   said candle filters are arranged on concentric circles centered on the center of said filter housing so that the density of said candle filters per unit volume decreases from the circumference to the center of said filter housing.

6. A filter apparatus as claimed in claim 5 and further comprising:
   a plurality of equilateral triangles, each formed by a set of three adjacent candle filters and having sides formed by lines connecting the midpoints of each of said three adjacent candle filters;
   a plurality of hydraulic areas, each defined by the area within one of said equilateral triangles which is bounded by the outer circumference of each of said three filters and the segments of said triangle connecting between each pair of outer circumferences; and
   a plurality of flow bodies for limiting the size of said hydraulic areas, each respectively located in one of said hydraulic areas.

7. A filter apparatus as claimed in claim 6 wherein:
   the outside diameter of said supporting body is determined by the formula: (outside diameter of supporting body =4 (hydraulic area)/(circumference of the hydraulic area)).

* * * * *